(12) United States Patent
Kim (10) Patent No.: US 8,797,263 B2
(45) Date of Patent: Aug. 5, 2014

(54) APPARATUS, METHOD FOR MEASURING 3 DIMENSIONAL POSITION OF A VIEWER AND DISPLAY DEVICE HAVING THE APPARATUS

(75) Inventor: Hyun Kim, Gyeonggi-do (KR)

(73) Assignee: Samsung Electro-Mechanics Co., Ltd., Suwon-Si, Gyunggi-Do (KR)

( * ) Notice: Subject to any disclaimer, the term of this patent is extended or adjusted under 35 U.S.C. 154(b) by 951 days.

(21) Appl. No.: 12/914,265

(22) Filed: Oct. 28, 2010

(65) Prior Publication Data

US 2012/0007799 A1 Jan. 12, 2012

(30) Foreign Application Priority Data

Jul. 8, 2010 (KR) .......................... 10-2010-0065857

(51) Int. Cl.
*G06F 3/033* (2013.01)

(52) U.S. Cl.
USPC .......................................... 345/157; 382/154

(58) Field of Classification Search
CPC .................. G06T 7/004–7/0048; G06F 3/012
USPC ..................... 345/55–111, 156–157; 382/154
See application file for complete search history.

(56) References Cited

U.S. PATENT DOCUMENTS

| 2009/0310818 A1 | 12/2009 | Lee et al. |
| 2010/0171697 A1* | 7/2010 | Son et al. .................... 345/158 |
| 2011/0096182 A1* | 4/2011 | Cohen et al. ............... 348/222.1 |

FOREIGN PATENT DOCUMENTS

| JP | 2009223581 A | 10/2009 |
| KR | 1020060071044 A | 6/2006 |
| KR | 1020100057946 A | 6/2010 |

OTHER PUBLICATIONS

Office Action corresponding to KR 10-2010-0065857, dated Sep. 27, 2011.
Office Action mailed Apr. 22, 2013 corresponds to Chinese patent application No. 201010557344.4.

* cited by examiner

*Primary Examiner* — Michael Pervan
(74) *Attorney, Agent, or Firm* — Lowe Hauptman & Ham, LLP (57) ABSTRACT

Disclosed herein are an apparatus, a method for measuring 3 dimensional positions of a viewer and a display device having the apparatus. The apparatus for measuring the 3 dimensional positions includes an image capturing module that photographs images included in objects; a detecting module that detects the objects from images photographed by the image capturing module and calculates sizes and coordinates of the images on the objects; and a position calculation module that calculates the 3-dimensional positions of the objects in the space in which the objects are positioned by using the information on the calculated sizes and coordinates of the image of the objects.

14 Claims, 6 Drawing Sheets

APPARATUS, METHOD FOR MEASURING 3 DIMENSIONAL POSITION OF A VIEWER AND DISPLAY DEVICE HAVING THE APPARATUS

CROSS REFERENCE TO RELATED APPLICATION

This application claims the benefit of Korean Patent Application No. 10-2010-0065857, filed on Jul. 8, 2010, entitled "Apparatus, Method For Measuring 3-Dimensional Position Of A Viewer And Display Device Having The Apparatus", which is hereby incorporated by reference in its entirety into this application.

BACKGROUND OF THE INVENTION

1. Technical Field

The present invention relates to a technology capable of measuring 3-dimensional watching positions of a viewer in a display device.

2. Description of the Related Art

Recently, the digitization, high definition, and multi-function of a display screen have rapidly progressed in the field of a TV display device. Therefore, the connection to outside digital home appliances has diversified and thus, the shape of transmitting and receiving from and to the home appliances has also correspondingly diversified. Henceforth, it is expected that TV will be used as a main control device for configuring and controlling home-based network by connecting home appliances, lighting devices, gas devices, heating devices, and security devices.

For example, the traditional TV has been used as only the broadcast display device that displays terrestrial broadcasting received from an antenna or cable broadcasting received through a cable. However, current TVs have been required to perform a role as a complex display device capable of displaying digital input signals in various formats, as, the home appliances have been recently digitized to be connected to the TV. For example, the current TVs have been required to display traditional analog broadcasting signals, digital broadcasting signals, input signals in various format such as a universal serial bus (USB), a high definition multimedia interface (HDMI), a PC input, etc.

Recently, TVs capable of displaying 3-dimensional images have been introduced. In the case of 3-dimensional display, there are various schemes such as a scheme of converting 2-dimensional images into 3-dimensional images and displaying them, a scheme of displaying 3-dimensional images in 3 dimensions, etc. However, since the 3-dimensional TV has not yet been completed technically, there is no display technology that enables viewers at various watching distances to comfortably watch the 3-dimensional TV. Therefore, dizziness occurs or the eyes become fatigued, according to the watching distance when the viewers watch the 3-dimensional TV for a long period of time, which is uncomfortable for the viewers.

SUMMARY OF THE INVENTION

An object of the present invention is to provide an optimal watching environment meeting various viewing positions by three-dimensionally detecting watching positions of viewers in a display device.

According to an exemplary embodiment of the present invention, there is provided an apparatus for measuring 3-dimensional positions of objects, including: an image capturing module that photographs images included in objects; a detecting module that detects the objects from images photographed by the image capturing module and calculates sizes and coordinates of the images on the objects; and a position calculation module that calculates the 3-dimensional positions of the objects in the space in which the objects are positioned by using the information on the calculated sizes and coordinates of the image of the objects.

The objects may be a part of the face, upper body, or body of the user.

The position calculation module may calculate the 3-dimensional positions of the objects within the space in which the objects are positioned by the following Equation.

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

(where $X_d$, $Y_d$, and $Z_d$ represent 3-dimensional position coordinates within the space in which the objects are positioned, $F_s$ represents a reference horizontal length of the predetermined object, $F_x$ represents a horizontal length within the image of the predetermined object, $I_x$ represents a horizontal size of the image, $I_y$ represents a vertical size of the image, $\theta_x$ represents a horizontal angle of view, $\theta_y$ represents a vertical angle of view, and $D_x$ and $D_y$ are 2-dimensional coordinates of the object).

According to another aspect of the present invention, there is provided an apparatus for measuring 3-dimensional positions of objects, including: an image capturing module that photographs images included in objects; a detecting module that detects the objects from images photographed by the image capturing module and calculates sizes and coordinates of the images on the objects; a correction module that corrects pre-stored reference size values of the objects by using information on sizes of the image of the objects calculated in the detection module; and a position calculation module that calculates the 3-dimensional position of the objects within the space in which the objects are positioned by using the reference size values of the corrected objects and the information on the sizes and coordinates on the image of the objects.

The objects may be a part of the face, upper body, or body of the user.

The correction module may estimate the vertical size of the object by using the information of the horizontal sizes on the image of the objects calculated in the detection module and corrects the reference size values of the objects by comparing the estimated vertical sizes of the objects with the vertical sizes on the images of the objects calculated in the detection module.

The estimated vertical sizes of the objects may be calculated by using the following Equation.

$$F_{yc} = (F_{sy} \times I_y) \div (2 \times Z_{dc} \times \tan(\theta_y))$$

$$Z_{dc} = (F_{sx} \times I_x) \div (2 \times F_{xd} \times \tan(\theta_x))$$

(where, $F_{yc}$ represents the estimated vertical size of the viewer, $F_{sx}$ represents the predetermined reference horizontal length of the viewer, $F_{sy}$ represents the predetermined reference vertical length of the viewer, $I_x$ represents the horizontal size of the image, $I_y$ represents the vertical size of the image, $\theta_x$ represents the horizontal angle of view of the image, $\theta_y$ represents the vertical angle of view of the image, and $F_{xd}$ represents the predetermined horizontal length of the viewer in the image).

The position calculation module may calculate the 3-dimensional positions of the objects within the space in which the objects are positioned by using the following Equation.

$$Z_d = Z_{dc}$$

$$X_d = (2 \times Z_d \times \tan(\theta_x) \times D_x)/I_x$$

$$Y_d = (2 \times Z_d \times \tan(\theta_y) \times D_y)/I_y$$

(where $X_d$, $Y_d$, and $Z_d$ represent actual positions in a 3-dimensional space of the objects and $D_x$ and $D_y$ are 2-dimensional coordinates of the objects in the image).

According to another aspect of the present invention, there is provided a display apparatus, including: a display module that displays images; an image capturing module that photographs images including viewers watching images displayed on the display module; a detecting module that detects the viewer from images photographed by the image capturing module and calculates sizes and coordinates on the images of the viewer; and a position calculation module that calculates the 3-dimensional positions of the viewer in the space in which the viewers are positioned by using the corrected reference size value of the viewer and the information on the calculated sizes and coordinates of the images of the viewer.

According to another aspect of the present invention, there is provided a display apparatus, including: a display module that displays images; an image capturing module that photographs images including viewers watching images displayed on the display module; a detecting module that detects the viewer from the image photographed by the image capturing module and calculates sizes and coordinates of the images of the viewer; a correction module that corrects the pre-stored reference size values of the viewer by using the information on the sizes of the images of the viewer calculated in the detection module; and a position calculation module that calculates the 3-dimensional positions of the viewer in the space in which the viewers are positioned by using the information on the calculated sizes and coordinates of the image of the viewer.

According to another aspect of the present invention, there is provided a method for measuring 3-dimensional positions of objects, including: photographing images including objects in an apparatus for measuring the 3-dimensional positions; detecting the objects from the images photographed by the image capturing module and calculating the sizes and coordinates of the images of the objects, in the apparatus for measuring the 3-dimensional positions; and calculating the 3-dimensional positions of the objects within a space in which the objects are positioned by using information on the sizes and coordinates on the calculated images of the objects, in the apparatus for measuring the 3-dimensional positions.

The objects may be a part of the face, upper body, or body of the user.

The calculating the 3-dimensional positions may calculate the 3-dimensional positions of the objects within the space in which the objects are positioned by the following Equation.

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

(where $X_d$, $Y_d$, and $Z_d$ represent 3-dimensional position coordinates within the space in which the objects are positioned, $F_s$ represents a reference horizontal length of the predetermined object, $F_x$ represents a horizontal length within the image of the predetermined object, $I_x$ represents a horizontal size of the image, $I_y$ represents a vertical size of the image, $\theta_x$ represents a horizontal angle of view, $\theta_y$ represents a vertical angle of view, and $D_x$ and $D_y$ are 2-dimensional coordinates of the object).

According to another aspect of the present invention, there is provided a method for measuring 3-dimensional positions, including: photographing images included in objects, in the apparatus for measuring the 3-dimensional positions; detecting the objects from images photographed by the image capturing module and calculating sizes and coordinates of the images on the objects, in the apparatus for measuring the 3-dimensional positions; correcting pre-stored reference size values of the objects by using information on the sizes of the image of the objects calculated in the detection module, in the apparatus for measuring the 3-dimensional positions; and calculating the 3-dimensional position of the objects within the space in which the objects are positioned by using the reference size values of the corrected objects and the information on the sizes and coordinates of the image of the objects, in the apparatus for measuring the 3-dimensional positions.

The objects may be a part of the face, upper body, or body of the user.

The correcting may estimate the vertical size of the object by using the information on the horizontal sizes of the image of the objects calculated in the detection module and corrects the reference size values of the objects by comparing the estimated vertical sizes of the objects with the vertical sizes of the images of the objects calculated in the detection module.

The estimated vertical sizes of the objects may be calculated by using the following Equation.

$$F_{yc} = (F_{sy} \times I_y) \div (2 \times Z_{dc} \times \tan(\theta_y))$$

$$Z_{dc} = (F_{sx} \times I_x) \div (2 \times F_{xd} \times \tan(\theta_x))$$

(where, $F_{yc}$ represents the estimated vertical size of the viewer, $F_{sx}$ represents the predetermined reference horizontal length of the viewer, $F_{sy}$ represents the predetermined reference vertical length of the viewer, $I_x$ represents the horizontal size of the image, $I_y$ represents the vertical size of the image, $\theta_x$ represents the horizontal angle of view of the image, $\theta_y$ represents the vertical angle of view of the image, and $F_{xd}$ represents the predetermined horizontal length of the viewer in the image).

The 3-dimensional position of the objects within the space in which the objects are positioned may b calculated by using the following Equation.

$$Z_d = Z_{dc}$$

$$X_d = (2 \times Z_d \times \tan(\theta_x) \times D_x)/I_x$$

$$Y_d = (2 \times Z_d \times \tan(\theta_y) \times D_y)/I_y$$

(where $X_d$, $Y_d$, and $Z_d$ represent actual positions in a 3-dimensional space of the objects and $D_x$ and $D_y$ are 2-dimensional coordinates of the objects in the image).

DESCRIPTION OF THE PREFERRED EMBODIMENTS

Hereinafter, exemplary embodiments of the present invention will be described with reference to the accompanying drawings. However, the invention may be embedded in many different forms and should not be construed as limited to the embodiments set forth herein.

In the following description, when it is determined that the detailed description of the conventional technology related to the present invention would confuse the gist of the present invention, such a description may be omitted. Terms used in the specification and claims herein are defined by considering the functions thereof in the present invention so that they may be varied according to a user's and an operator's intentions or practices. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Figure 1:
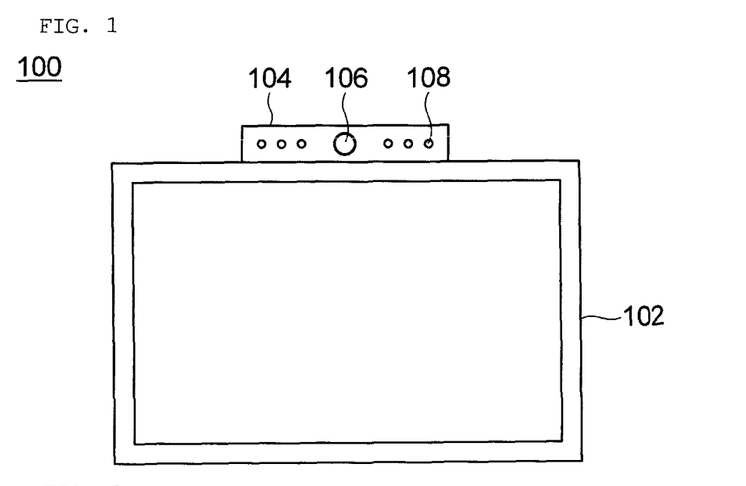
FIG. 1 is a diagram showing a display device 100 according to an exemplary embodiment of the present invention.

FIG. 1 is a diagram showing a display device 100 according to an exemplary embodiment of the present invention.

As shown in FIG. 1, a display device 100 according to an exemplary embodiment of the present invention includes a display unit 102 and a three-dimensional position measuring unit 104.

The display unit 102 is a component of displaying images. For example, the display unit 102 may be, for example, a monitor, a TV, or the like.

The 3-dimensional position measuring unit 104 calculates positions within a 3-dimensional space of a viewer that watches images displayed on the display unit 102. The 3-dimensional position measuring unit 104 may include a camera 106 for photographing the images of the viewer. As a result, the 3-dimensional position measuring unit 104 calculates the positions within the 3-dimensional space of the viewer by using the sizes and positions of the user included in the photographed images. The camera 106 may be positioned at the upper end of the display unit 102 but may be positioned at, for example, any place as long as it can be photographed at the front of the display unit 102. The 3-dimensional position measuring unit 104 may further include a separate infra red (IR) light source device to enable the camera 106 to acquire images even under a low illumination environment.

Figure 2:
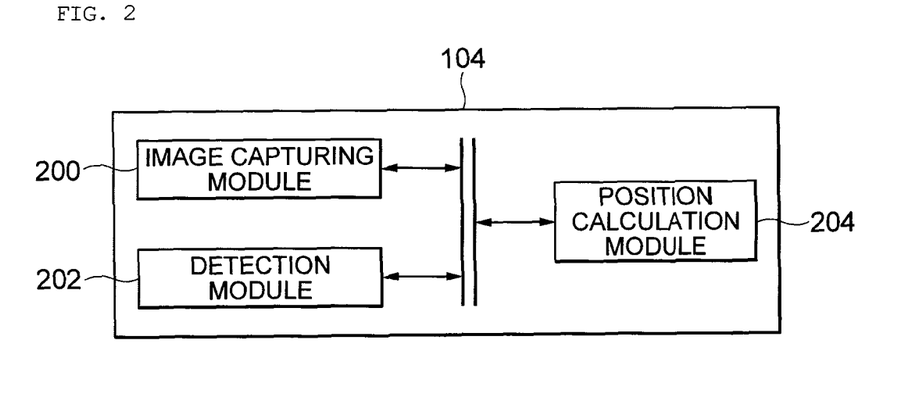
FIG. 2 is a diagram showing a configuration of a 3-dimensional position measuring unit 104 according to an exemplary embodiment of the present invention.

FIG. 2 is a diagram showing a configuration of a 3-dimensional position measuring unit 104 according to an exemplary embodiment of the present invention.

As shown, the 3-dimensional position measuring unit 104 according to an exemplary embodiment of the present invention includes an image capturing module 200, a detection module 202, and a position calculation module 204.

The image capturing module 200 uses the camera 104 to photograph the image of the viewer watching images displayed on the display unit 102.

The detection module 202 detects the viewer from images photographed by the image capturing module 200 to calculate the sizes and coordinates of the image of the viewer. In order to detect the viewer, the detection module 202 may include a face detection algorithm. The face detection algorithm detecting a person's face from the digital images is known in the art and therefore, the detailed description thereof will be omitted. The detection module 202 can detect only the viewer's face. Alternatively, the detection module 202 can detect a part of a body (for example, the upper body, hand, or the like). In addition, the exemplary embodiment of the present invention detects the viewer (that is, person), but is not limited thereto. The exemplary embodiment of the present invention can detect specific objects other than a person and can also calculate the positions.

The position calculation module 204 uses the information on the calculated sizes and coordinates of the image of the viewer to calculate the 3-dimensional positions of the viewer in a space in which the viewer is positioned. The process of calculating the viewer using the position calculation module 204 will be described in more detail below.

Figure 3:
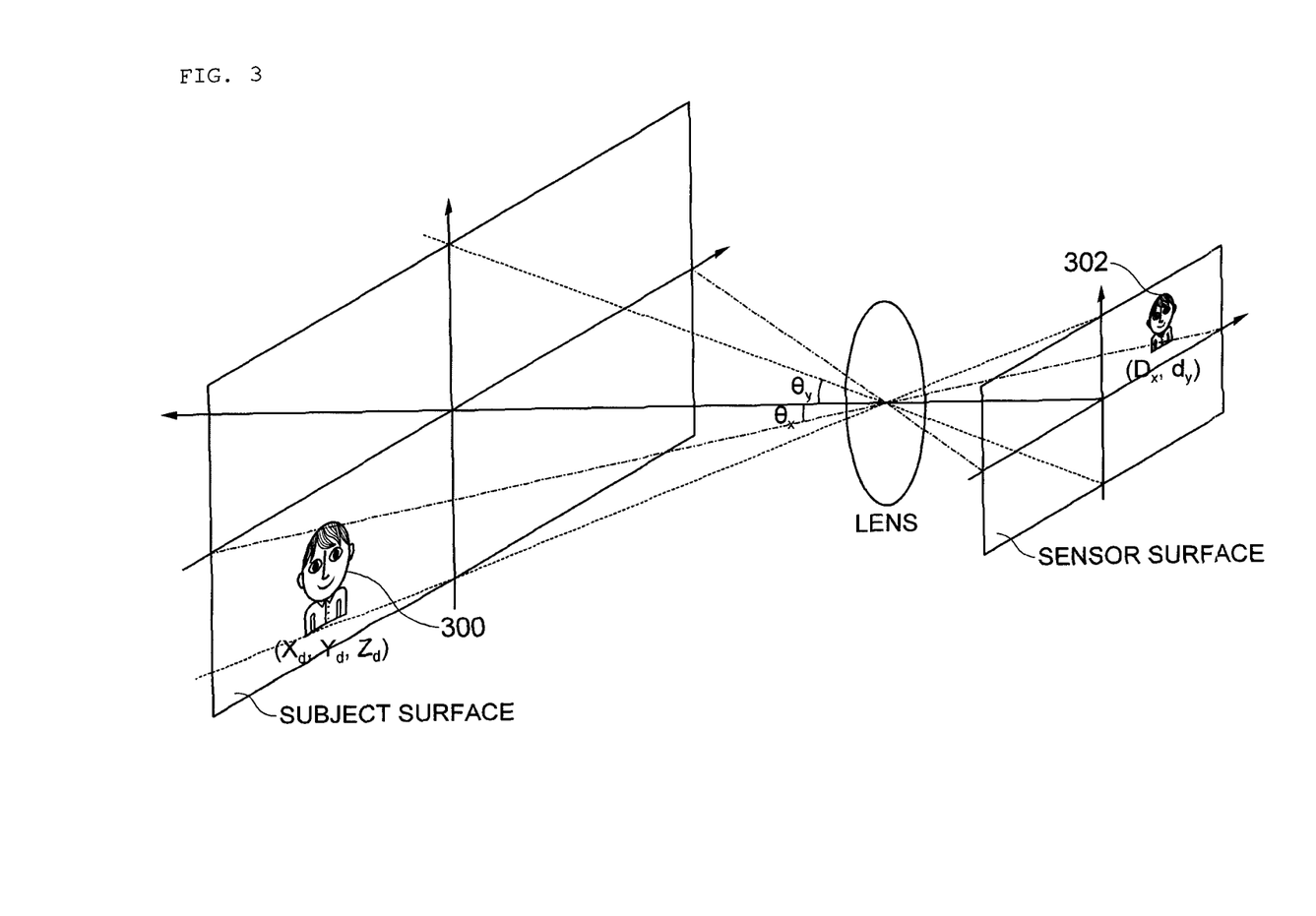
FIGS. 3 and FIGS. 4A and 4B are diagrams for explaining a 3-dimensional positioning process of a viewer according an exemplary embodiment of the present invention.
Figure 4A:
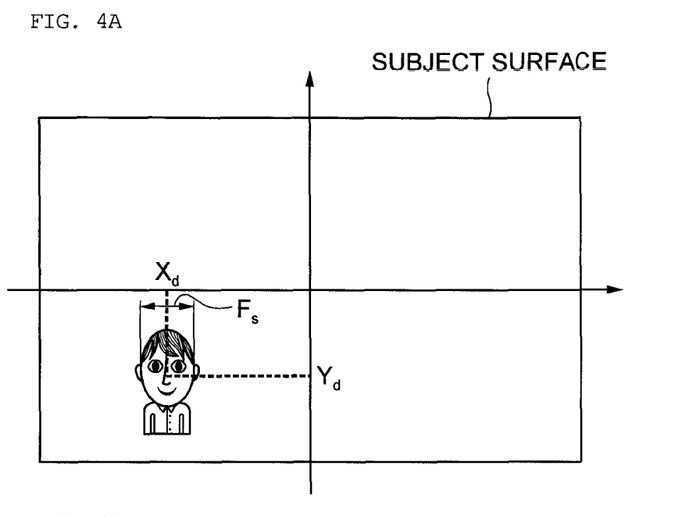
Figure 4B:
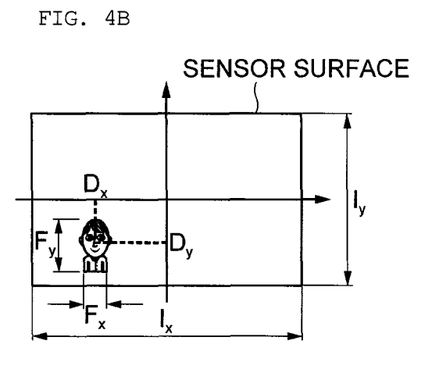

FIGS. 3 and FIGS. 4A and 4B are diagrams for explaining a 3-dimensional positioning process of a viewer according an exemplary embodiment of the present invention.

As shown, when the viewer 300 watches the 3-dimensional TV at a distance away by $X_d$, $Y_d$, and $Z_d$ cm from the lens of the camera 104, the image 302 of the viewer is formed at a place away by $D_x$ and $D_y$ pixels from the center of the sensor surface of the camera 104. In drawing, $\theta_x$ represents a horizontal angle of view of the camera 104, $\theta_y$ represents a vertical angle of view of the camera 104, $I_x$ represents a horizontal size (pixel) of the photographed image, $I_y$ represents a vertical size (pixel) of the image, $F_x$ represents a vertical size (pixel) of the image 302 of the viewer within the image, and $F_y$ represents a vertical size (pixel) of the image 302 of the viewer within the image.

If the reference horizontal length of the viewer 300 stored in the position calculation module 204 is $F_s$, the 3-dimensional position coordinates $X_d$, $Y_d$, and $Z_d$ of the viewer 300 may be calculated as follows.

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

In other words, if the position calculation module 204 according to the exemplary embodiment of the present invention previously stores $I_x$, $I_y$, $\theta_x$, $\theta_y$, and $F_s$ values and then, detects a part of a body such as the face, upper body, or hand of the viewer, the 3-dimensional position coordinates of the viewer is calculated by using the detection positions $D_x$ and $D_y$ and sizes $F_x$ and $F_y$ of the viewer and the pre-stored information.

In this case, the $F_s$ value is a reference value for the 3-dimensional position calculation of the viewer. For example, since the average horizontal width of a face of a Korean man is about 16 cm, the 3-dimensional positions of the viewer are calculated based on the face of the viewer, such that the $F_s$ value may be set to 16 cm. When the 3-dimensional positions are calculated based on the upper body of the viewer, the $F_s$ value may be set to the average horizontal length of the upper body of the viewer.

Figure 5:
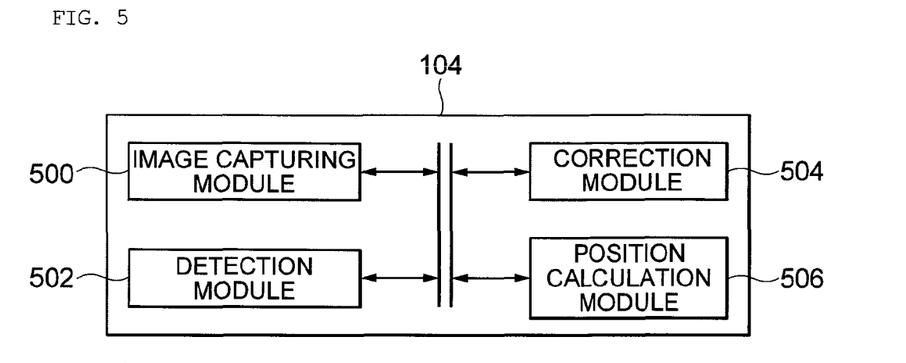
FIG. 5 is a diagram showing a configuration of the 3-dimensional position measuring unit 104 according to another exemplary embodiment of the present invention.

FIG. 5 is a diagram showing a configuration of the 3-dimensional position measuring unit 104 according to another exemplary embodiment of the present invention.

As shown, the 3-dimensional position measuring unit 104 according to another exemplary embodiment of the present invention includes an image capturing module 500, a detection module 502, a correction module, and a position calculation module 506.

The image capturing module 500 uses the camera 104 to photograph the image of the viewer watching images displayed on the display unit 102.

The detection module 502 detects the viewer from images photographed by the image capturing module 500 to calculate the sizes and coordinates of the image of the viewer. In order to detect the viewer, the detection module 502 may include a face detection algorithm. The detection module 502 can detect only the viewer's face. Alternatively, the detection module 502 can detect a part of a body (for example, the upper body).

The correction module 504 uses the size information on the calculated image of the viewer in the detection module 502 to correct the pre-stored reference size value of the viewer.

In the case of the exemplary embodiment shown in FIGS. 2 to 4B, the reference horizontal length $F_s$ of the viewer should be previously known in order to calculate the 3-dimensional positions of the viewer. However, since the horizontal length of the face or the upper body of the viewer may be different from each other, when the reference horizontal length is similarly applied to all the users, errors occur in the detected 3-dimensional position values.

Therefore, the exemplary embodiment corrects the reference size value of the viewer in the correction module 504 in order to minimize the errors.

Figure 6:
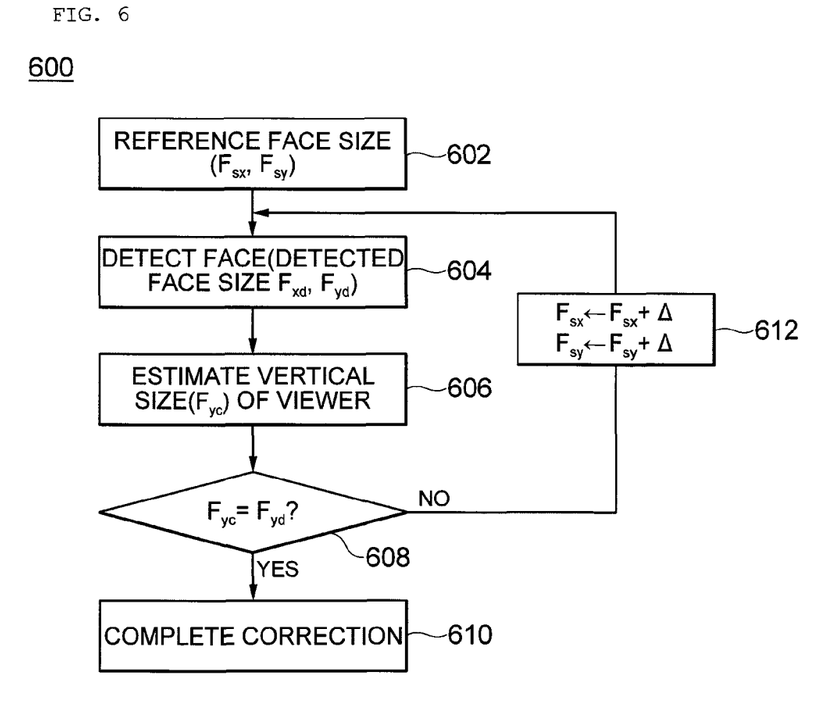
FIG. 6 is a diagram for explaining a process (600) of correcting a reference size value of a viewer in a correction module 504.

FIG. 6 is a diagram for explaining a process (600) of correcting a reference size value of a viewer in a correction module 504.

First, it is assumed that the face and face sizes $F_{xd}$ and $F_{yd}$ of the viewer are detected from the image in the state where the reference face size of the viewer is set to $F_{sx}$ and $F_{sy}$ (602 and 604). Although the exemplary embodiment is described based on the face of the viewer, the present invention may be similarly applied to the face, the upper body, the hand, or the like, as described above.

As described above, when the face size of the viewer is detected from the image, the correction module 504 uses the horizontal size $F_{xd}$ information on the calculated images of the viewer in the detection module 502 to estimate the vertical size $F_{yc}$ (606). The estimation of the above-mentioned vertical size $F_{yc}$ of the viewer may be calculated by the following Equation.

$$F_{yc}=(F_{sy}\times I_y)\div(2\times Z_{dc}\times\tan(\theta_y))$$

$$Z_{dc}=(F_{sx}\times I_x)\div(2\times F_{xd}\times\tan(\theta_x))$$

In this case, $F_{yc}$ represents the estimated vertical size of the viewer, $F_{sx}$ represents the predetermined reference horizontal length of the viewer, $F_{sy}$ represents the predetermined reference of the vertical length of the viewer, Ix represents the vertical size of the image, $I_y$ represents the vertical size of the image, $\theta_x$ represents the horizontal angle of view of the image, $\theta_y$ represents the vertical angle of view of the image, and $F_{xd}$ represents the predetermined horizontal length of the viewer in the image.

Next, the correction module 504 compares the estimated $F_{yc}$ value with the actually detected vertical size Fyd in the detection module 502 (608). If two values are the same, there is no need to perform the correction (610). However, if two values are different from each other, the correction module 504 repeats steps 604 to 608 while changing $F_{sx}$ and $F_{sy}$ values by a predetermined size when the two values are the same.

Meanwhile, the position calculation module 506 uses the information on the calculated sizes and coordinates and the corrected $F_{sx}$ and $F_{sy}$ values of the images of the viewer to calculate the 3-dimensional positions of the viewer in a space in which the viewer is positioned. The position calculation in the position calculation module 506 is calculated by the following Equation.

$$Z_d=Z_{dc}$$

$$X_d=(2\times Z_d\times\tan(\theta_x)\times D_x)/I_x$$

$$Y_d=(2\times Z_d\times\tan(\theta_y)\times D_y)/I_y$$

In this case, $X_d$, $Y_d$, and $Z_d$ represent the actual positions in the 3-dimensional space of the user and Dx and Dy represent the 2-dimensional coordinate of the viewer in the image.

Figure 7:
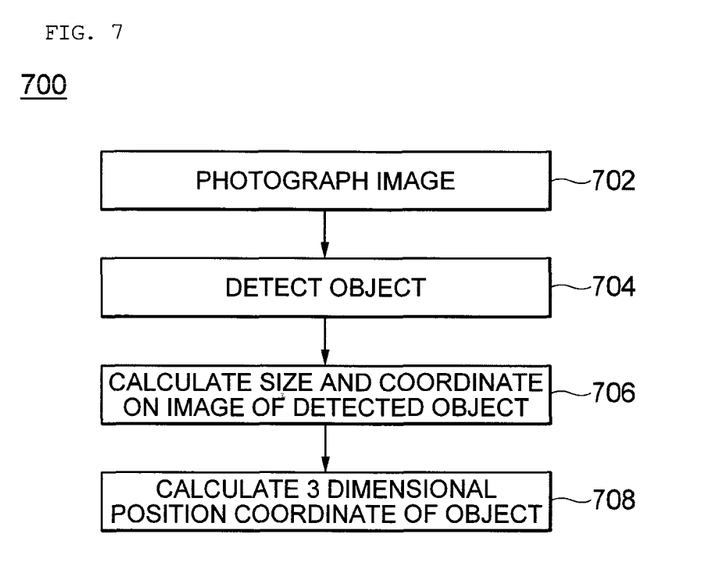
FIG. 7 is a diagram showing a method 700 for measuring 3-dimensional positions according to an exemplary embodiment of the present invention.

FIG. 7 is a diagram showing a method 700 for measuring 3-dimensional positions according to an exemplary embodiment of the present invention.

First, the image including the viewer is photographed in the 3-dimensional position measuring unit 104 (702).

Next, the viewer is detected from the image photographed by the image capturing module (704) and the sizes and coordinates of the image of the viewer are calculated (706).

Next, the 3-dimensional positions of the viewer are calculated in the space in which the viewer is positioned by using the information on the calculated sizes and coordinates of the image of the viewer calculation module (708).

Figure 8:
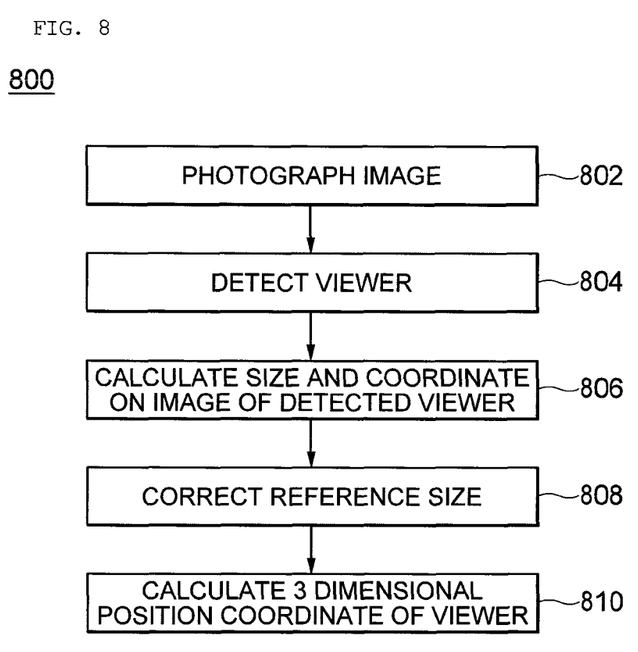
FIG. 8 is a diagram showing a method 800 for measuring 3-dimensional positions according to another exemplary embodiment of the present invention.

FIG. 8 is a diagram showing a method 800 for measuring 3-dimensional positions according to another exemplary embodiment of the present invention.

First, the image including the viewer is photographed in the 3-dimensional position measuring unit 104 (802).

Next, the viewer is detected from the photographed image (804) and the sizes and coordinates of the image of the viewer are calculated (806).

Next, the pre-stored reference size value of the viewer is corrected by using the information on the sizes of the image of the viewer (808).

Next, the 3-dimensional positions of the viewer are calculated in the space in which the viewer is positioned by using the information on the calculated sizes and coordinates of the image of the viewer calculation module (810).

According to the present invention, the viewer of the image is detected to calculate the 3-dimensional coordinates of the viewer and the calculated 3-dimensional coordinates may be used to increase the viewing convenience and the viewing quality of the viewer.

For example, it may be assumed that the display device 100 is a device capable of reproducing the 3-dimensional images. The existing 3D TV generates the 3-dimensional images under the assumption that the user is generally positioned at the preset specific distance from the TV screen. Therefore, when the viewer is not positioned at the center of the TV or is positioned too close to the display or too far away from the display, it is difficult to satisfactorily receive the 3-dimensional image. However, according to the present invention, the positions of the viewer can be calculated in real time to dynamically change the focal distance of the 3D TV according to the positions of the viewer, thereby making it possible to comfortably provide a 3-dimensional viewing environment at any position.

Further, the present invention can simultaneously detect the plurality of viewers, such that it can simultaneously display the 3-dimensional image most suitable for each of the plurality of viewers watching the TV at different distances.

Meanwhile, when the method of calculating the 3-dimensional distance of the viewer proposed in the present invention is used, the TV audio most suitable for the viewer can be provided. For example, when the viewer is at the closest distance, the volume can be reduced and when the viewer is at the long distance, the volume can be increased. When the viewers are crowded in a specific direction, the output of the volume is increased in that direction, such that the persons not watching the TV will not be hindered by the noise.

In addition, when the camera does not detect the viewers for a predetermined time, the power supply for the TV is automatically turned-off. To the contrary, when the camera detects the face for a predetermined time, the TV may be automatically turned-on. When the viewers are children, if the watching distance is short, a warning message is displayed on the TV or a warning sound is issued, such that the children can watch the TV at a sufficient watching distance.

The exemplary embodiments of the present invention can allow the viewers to more comfortably watch the display device by three-dimensionally detecting the watching positions of the viewers in the display device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. An apparatus for measuring 3-dimensional positions of objects, the apparatus comprising:
    an image capturing module that acquires an image including an object;
    a detecting module that detects the object from the image acquired by the image capturing module and calculates sizes and coordinates of the object within the image; and
    a position calculation module that calculates the 3-dimensional position of the object in the space in which the object is positioned by using the following equations:

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

where
$X_d$, $Y_d$, and $Z_d$ represent 3-dimensional coordinates within the space in which the object is positioned,
$F_s$ represents a reference horizontal size of the object stored in the position calculation module,
$F_x$ represents a horizontal size of the object within the image,
$I_x$ represents a horizontal size of the image,
$I_y$ represents a vertical size of the image,
$\theta_x$ represents a horizontal angle of view of a camera used by the image capturing module to acquire the image,
$\theta_y$ represents a vertical angle of view of the camera, and
$D_x$ and $D_y$ are 2-dimensional coordinates of the object within the image.

2. The apparatus according to claim 1, wherein the object includes a part of the face, upper body, or body of a user.

3. An apparatus for measuring 3-dimensional positions of objects, the apparatus comprising:
    an image capturing module that acquires an image including an object;
    a detecting module that detects the object from the image acquired by the image capturing module and calculates sizes and coordinates of the object within the image;
    a correction module that
        estimates a vertical size of the object by using information on a horizontal size of the object on the image as calculated in the detecting module, and
        corrects reference sizes of the object by comparing the estimated vertical size of the object with a vertical size of the object on the image as calculated in the detecting module; and
    a position calculation module that calculates the 3-dimensional position of the object within the space in which the object is positioned by using the corrected reference sizes of the object and information on the calculated sizes and coordinates of the object on the image.

4. The apparatus according to claim 3, wherein the object includes a part of the face, upper body, or body of a user.

5. The apparatus according to claim 3, wherein the estimated vertical size of the object is calculated by using the following equations:

$$F_{yc} = (F_{sy} \times I_y) \div (2 \times Z_{dc} \times \tan(\theta_y))$$

$$Z_{dc} = (F_{sx} \times I_x) \div (2 \times F_{xd} \times \tan(\theta_x))$$

where
$F_{yc}$ represents the estimated vertical size of the viewer object,
$F_{sx}$ represents a reference horizontal length size of the object,
$F_{sy}$ represents a reference vertical size of the object,
$I_x$ represents a horizontal size of the image,
$I_y$ represents a vertical size of the image,
$\theta_x$ represents a horizontal angle of view of a camera used by the image capturing module to acquire the image,
$\theta_y$ represents a vertical angle of view of the camera, and
$F_{xd}$ represents a horizontal size of the object in the image.

6. The apparatus according to claim 5, wherein the position calculation module calculates the 3-dimensional position of the object within the space in which the object is positioned by using the following equations:

$$Z_d = Z_{dc}$$

$$X_d = (2 \times Z_d \times \tan(\theta_x) \times D_x)/I_x$$

$$Y_d = (2 \times Z_d \times \tan(\theta_y) \times D_y)/I_y$$

where
$X_d$, $Y_d$, and $Z_d$ represent 3-dimensional coordinates of the object, and
$D_x$ and $D_y$ are 2-dimensional coordinates of the object in the image.

7. A display apparatus, comprising:
    a display module;
    an image capturing module that acquires an image including a viewer watching the display module;
    a detecting module that detects the viewer from the image acquired by the image capturing module and calculates sizes and coordinates of the viewer within the image; and
    a position calculation module that calculates the 3-dimensional position of the viewer in the space in which the viewer is positioned by using the following equations:

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

where $X_d$, $Y_d$, and $Z_d$ represent 3-dimensional coordinates within the space in which the viewer is positioned, $F_s$ represents a reference horizontal size of the viewer stored in the position calculation module, $F_x$ represents a horizontal size of the viewer within the image, $I_x$ represents a horizontal size of the image, $I_y$ represents a vertical size of the image, $\theta_x$ represents a horizontal angle of view of a camera used by the image capturing module to acquire the image, $\theta_y$ represents a vertical angle of view of the camera, and $D_x$ and $D_y$ are 2-dimensional coordinates of the viewer within the image.

8. A display apparatus, comprising:

a display module;

an image capturing module that acquires an image including a viewer watching the display module;

a detecting module that detects the viewer from the image acquired by the image capturing module and calculates sizes and coordinates of the viewer within the image;

a correction module that
   estimates a vertical size of the viewer by using information on a horizontal size of the viewer on the image as calculated in the detecting module, and
   corrects reference sizes of the viewer by comparing the estimated vertical size of the viewer with a vertical size of the viewer on the image as calculated in the detecting module; and a position calculation module that calculates the 3-dimensional position of the viewer in the space in which the viewer is positioned by using the corrected reference sizes of the viewer and information on the calculated sizes and coordinates of the viewer on the image.

9. A method for measuring 3-dimensional positions of objects, the method comprising:

acquiring an image including an object, in an apparatus for measuring the 3-dimensional positions;

detecting the object from the image acquired at said acquiring and calculating sizes and coordinates of the object within the image, in the apparatus for measuring the 3 dimensional positions; and calculating the 3-dimensional position of the object within a space in which the object is positioned, in the apparatus for measuring the 3-dimensional positions, by using the following equations:

$$Z_d = (F_s \times I_x) \div (2 \times F_x \times \tan(\theta_x))$$

$$X_d = (2 \times Z_d \times \tan(\theta_x) \times D_x)/I_x$$

$$Y_d = (2 \times Z_d \times \tan(\theta_y) \times D_y)/I_y$$

where $X_d$, $Y_d$, and $Z_d$ represent 3-dimensional coordinates within the space in which the object is positioned, $F_s$ represents a reference horizontal size of the object stored in the position calculation module, $F_x$ represents a horizontal size of the object within the image, $I_x$ represents a horizontal size of the image, $I_y$ represents a vertical size of the image, $\theta_x$ represents a horizontal angle of view of a camera used to acquire the image, $\theta_y$ represents a vertical angle of view of the camera, and $D_x$ and $D_y$ are 2-dimensional coordinates of the object within the image.

10. The method according to claim 9, wherein the object includes a part of the face, upper body, or body of a user.

11. A method for measuring 3-dimensional positions, the method comprising:

acquiring an image including an object, in an apparatus for measuring the 3-dimensional positions;

detecting the object from the image acquired at said acquiring and calculating sizes and coordinates of the object within the image, in the apparatus for measuring the 3-dimensional positions;

estimating a vertical size of the object by using information on a horizontal size of the object on the image as calculated at said calculating, in the apparatus for measuring the 3-dimensional positions;

correcting reference sizes of the object by comparing the estimated vertical size of the object with a vertical size of the object on the image as calculated at said calculating, in the apparatus for measuring the 3-dimensional positions; and calculating the 3-dimensional position of the object within the space in which the object is positioned by using the corrected reference sizes of the object and information on the calculated sizes and coordinates of the object on the image, in the apparatus for measuring the 3-dimensional positions.

12. The method of claim 11, wherein the object includes a part of the face, upper body, or body of a user.

13. The method according to claim 11, wherein the estimated vertical size of the object is calculated by using the following equations:

$$F_{yc} = (F_{sy} \times I_y) \div (2 \times Z_{dc} \times \tan(\theta_y))$$

$$Z_{dc} = (F_{sx} \times I_x) \div (2 \times F_{xd} \times \tan(\theta_x))$$

where $F_{yc}$ represents the estimated vertical size of the object, $F_{sx}$ represents a reference horizontal size of the object, $F_{sy}$ represents a reference vertical size of the object, $I_x$ represents a horizontal size of the image, $I_y$ represents a vertical size of the image, $\theta_x$ represents a horizontal angle of view of a camera used to acquire the image, $\theta_y$ represents a vertical angle of view of the camera, and $F_{xd}$ represents a horizontal size of the object in the image.

14. The method according to claim 13, wherein the 3-dimensional position of the object within the space in which the object is positioned is calculated by using the following equations:

$$Z_d = Z_{dc}$$

$$X_d = (2 \times Z_d \times \tan(\theta_x) \times D_x)/I_x$$

$$Y_d = (2 \times Z_d \times \tan(\theta_y) \times D_y)/I_y$$

where $X_d$, $Y_d$, and $Z_d$ represent 3-dimensional coordinates of the object, and $D_x$ and $D_y$ are 2-dimensional coordinates of the object in the image.

* * * * *